(12) United States Patent
Miksovsky

(10) Patent No.: US 12,280,336 B2
(45) Date of Patent: Apr. 22, 2025

(54) MEMBRANE GAS SEPARATOR WITH A BUILT-IN VALVE AND THE METHOD OF ITS OPENING AND CLOSING

(71) Applicant: EKOM spol. s r.o., Piestany (SK)

(72) Inventor: Jaromir Miksovsky, Piestany (SK)

(73) Assignee: EKOM spol. s r.o., Piestany (SK)

( * ) Notice: Subject to any disclaimer, the term of this patent is extended or adjusted under 35 U.S.C. 154(b) by 387 days.

(21) Appl. No.: 17/767,611

(22) PCT Filed: Oct. 8, 2020

(86) PCT No.: PCT/SK2020/050018
§ 371 (c)(1),
(2) Date: Apr. 8, 2022

(87) PCT Pub. No.: WO2021/071441
PCT Pub. Date: Apr. 15, 2021

(65) Prior Publication Data
US 2023/0277983 A1    Sep. 7, 2023

(30) Foreign Application Priority Data

Oct. 10, 2019   (SK) .................................... 109-2019

(51) Int. Cl.
*B01D 63/02*      (2006.01)
*B01D 53/22*      (2006.01)
(Continued)

(52) U.S. Cl.
CPC ............ *B01D 63/02* (2013.01); *B01D 53/22* (2013.01); *B01D 53/268* (2013.01); *B01D 65/02* (2013.01);
(Continued)

(58) Field of Classification Search
CPC ........ B01D 53/22; B01D 53/26; B01D 63/02; B01D 65/02
See application file for complete search history.

(56) References Cited

U.S. PATENT DOCUMENTS 8,182,591 B2 * 5/2012 Deubler ............... B01D 63/032
96/10

FOREIGN PATENT DOCUMENTS

EA          011902 B1     6/2009
JP        H0957043 A      3/1997
(Continued)

OTHER PUBLICATIONS

World Intellectual Property Organization, International Search Report for international application No. PCT/SK2020/050018, mail date Jan. 26, 2021, 2 total pages.

*Primary Examiner* — Sharon Pregler
(74) *Attorney, Agent, or Firm* — SoCal IP Law Group LLP; Mark Andrew Goldstein

(57) ABSTRACT

A membrane gas separator with a built-in valve along with a method of open and closing the membrane gas separator are disclosed herein. The membrane separator contains an inlet chamber, hollow selective fibres, an outlet chamber, a central core element and a flushing space. The membrane separator contains a built-in combined valve in the outlet chamber and a check valve at an inlet manifold. The built-in valve contains a throttling section to ensure a reduced backflow of a final product from the outlet manifold to the inner space of hollow fibres, and the sealing section to stop the flow of the flushing medium from the outlet chamber to the flushing space when no inlet medium flows through the separator. The method of opening of the membrane separator includes opening of the sealing section and subsequent opening and deactivation of the throttling section. The method of closing of the membrane separator (Continued)

includes closing and activation of the throttling section and closing of the sealing section.

10 Claims, 3 Drawing Sheets

(51) Int. Cl.
    *B01D 53/26*     (2006.01)
    *B01D 65/02*     (2006.01)

(52) U.S. Cl.
    CPC .... *B01D 2053/224* (2013.01); *B01D 2257/80* (2013.01); *B01D 2313/18* (2013.01); *B01D 2321/04* (2013.01); *B01D 2321/12* (2013.01); *B01D 2321/185* (2013.01)

(56) References Cited

FOREIGN PATENT DOCUMENTS

| | | |
|---|---|---|
| JP | H1133338 A | 2/1999 |
| JP | 2001219026 A | 8/2001 |
| WO | 2021071441 A1 | 4/2021 |

* cited by examiner

MEMBRANE GAS SEPARATOR WITH A BUILT-IN VALVE AND THE METHOD OF ITS OPENING AND CLOSING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from International PCT Patent Application No. PCT/SK2020/050018, filed Oct. 8, 2020 entitled, "A MEMBRANE GAS SEPARATOR WITH A BUILT-IN VALVE AND THE METHOD OF ITS OPENING AND CLOSING", which claims priority to Slovakia Patent Application No. PP 109-2019, filed Oct. 10, 2019 entitled, "DIAPHRAGM GAS SEPARATOR WITH BUILT-IN VALVE AND METHOD OF OPENING AND CLOSING IT", all of which are incorporated herein by reference in their entirety.

TECHNICAL FIELD

The invention concerns the membrane gas separator containing selective hollow fibres and a built-in valve; and the method of opening and closing this valve.

BACKGROUND ART

Nowadays, membrane separators with a large number of selective fibres for separation of a certain component of the medium entering the separator are widely used in gas separation.

Membrane separators typically consist of an outer tube where hollow selective fibres are located around the inner central core element interconnected with the flushing space surrounding hollow fibres; an input casing with an inlet hole to connect the inlet medium and an outlet casing with an outlet hole for a final product outlet; and a flushing nozzle normally located in the central core element and ensuring that the defined part of the final product is used for counter-flow flushing of the outer fibre surface and taking the separated component through the outlet hole in the outer tube.

It is well known that the operation with a constant pressure in fibres is optimum for service life of selective fibres while cyclic pressure stress affects the service life of selective fibres in a negative way.

In many applications, these type separators are connected in the section of the pneumatic system subject to significant pressure changes (e.g. unloaded compressor branch). In these cases, it is good to isolate the membrane separator from the section affected by pressure changes in order to maintain the pressure in fibres (e.g. using the check valve) and ensure permanent connection to the sections kept under pressure (e.g. pipeline downstream the separator, pressure vessel and the like). With this type of connection, it is necessary to maintain continuous connection of the inner space of fibres with sections under pressure in order to avoid pressure drop inside the fibres due to natural fibre permeability causing minor leakage of the final product through fibre walls. At the same time, it is good to prevent final product leakage from pressure sections downstream the separator through a flushing nozzle when the inlet media flow is stopped.

To achieve the mentioned function, there are solutions where the final product is fed to the flushing nozzle outside the body of the separator and the flow is externally controlled (e.g. by a solenoid valve). The example of such solution is provided in U.S. Pat. No. 5,108,464. However, the solutions like the one mentioned above are relatively complicated and require temporary control and connection elements.

Other solutions deal with the control (two-position—opening/closing) or regulation of the flushing medium quantity depending on the inlet media flow by means of elements integrated directly in the body of the membrane separator. The example of such solution is provided in U.S. Pat. No. 6,740,140. For correct integrated inner valve opening, this solution requires continuous small leakage of the final product based on bypassing the valve also in case the valve is closed. At the same time, when connection is made in the part of the manifold with major pressure changes as described above, this solution makes it impossible to compensate the natural leakage arising from fibre permeability, and thus makes it impossible to maintain the pressure difference between the inner and surrounding areas of fibres constant or with as little fluctuation as possible (depending on changes in working pressure in the system downstream the membrane separator.

The objective of the invention is to provide a simple solution fully integrated in the body of the separator and robust to withstand production inaccuracies while maintaining as stable pressure difference between membrane separator fibres and their surroundings as possible to maximise the service life of membrane separator fibres in applications with significant pressure and flow changes at the inlet of the membrane separator. The invention also aims to ensure zero leakage of the flushing medium from the outlet chamber to the flushing space when the inlet medium flow is closed. The invention further aims to ensure compensation of the natural leakage arising from the fibre permeability and prevent the change in pressure difference (pressure equalization) between the inner and surrounding areas of fibres when the inlet medium flow is closed.

SUMMARY OF INVENTION

According to this invention, the membrane gas separator with a built-in valve and the method of its opening and closing largely eliminates these deficiencies.

The membrane separator according to this invention contains the known design of the inlet chamber, hollow selective fibres, outlet chamber, central core element and the flushing space. The inlet chamber is used to feed the inlet medium from the inlet manifold. Hollow selective fibres are used to feed the inlet medium and for separated component leakage from the inlet medium to the flushing space through fibre walls. Hollow selective fibres are used to interconnect the inlet and outlet chambers. The outlet chamber serves to feed the final product to the outlet manifold. Pneumatic outlets of hollow fibres lead to the outlet chamber through its outlet wall. The central core element has the central space that pneumatically interconnects the inlet chamber with the flushing space through the flushing nozzle. The central core element is used to feed the flushing medium to the flushing space. The flushing space surrounds hollow fibres and it is used to remove the separated component from the outer surface of the fibres using the flushing medium.

The membrane gas separator with a built-in valve according to this invention may be summarized as follows: the built-in valve of this separator is combined, it is situated in the outlet chamber and central space and, as a built-in combined valve it contains throttling and sealing sections. The throttling section is located at the pneumatic connection of the outlet chamber with the inner space of hollow fibres in order to ensure reduced backflow of the final product from the outlet manifold through the outlet chamber to the inner space of hollow fibres when no inlet medium flows through the separator. The throttling section separates the interspace in the outlet chamber. This interspace is pneumatically connected with the inner space of hollow fibres. The sealing section is located at the pneumatic connection of the outlet chamber interspace and the central space to stop the flushing media flow from the outlet chamber through the central space to the flushing space when no inlet medium flows through the separator. The throttling section is located at the pneumatic connection between the interspace and outlet chamber to ensure opening of the sealing section by the final product flow creating a suitable flow resistance. Furthermore, the membrane gas separator contains a check valve located at the pneumatic connection between the inlet manifold and the inlet chamber to stop the backflow of the inlet medium and the final product from the inlet chamber, fibres and outlet chamber back in the inlet manifold when no inlet medium flows through the separator.

In the preferred embodiment, the built-in combined valve contains a valve plate, outer flexible element, flexible membrane and a shoulder. The valve plate is movably located in the outlet chamber. The outer flexible element is located in the outlet chamber between the wall opposite to the outlet wall and the valve plate. The flexible membrane is placed in the valve plate. The shoulder is located in the central space and it pneumatically interconnects the interspace of the outlet chamber and the central space. The throttling section is created at the point where the valve plate is pressed against the outlet wall by means of the outer flexible element, wherein a small leakage is deliberately created at the push-down point. The sealing section is created at the point of the close push-down contact between the flexible membrane and the shoulder. The interspace is created by the inner space of the valve plate between the flexible membrane and the outlet wall. The flexible force of the flexible membrane is lower than that of the outer flexible element in order to ensure that the sealing section opens earlier than the throttling section when the inlet medium starts flowing through the separator.

The valve plate preferentially contains a peripheral edge and a contact area on the peripheral edge. The flexible membrane is placed in the peripheral edge. The throttling section is created at the point where the contact area is pushed against the outlet wall. The interspace is created by the contact area and the peripheral edge surrounding all hollow fibre outlet mouths in the outlet wall.

The valve plate preferentially contains an end and an inner flexible element located inside the valve plate between the end and the flexible membrane. The flexible membrane is pushed against the shoulder by the inner flexible element, and in this embodiment the flexibility force of the inner flexible element together with the flexible membrane is lower than that of the outer flexible element in order to ensure that the sealing section opens earlier than the throttling section when the inlet medium starts flowing through the separator.

The shoulder preferentially contains a flushing hole to feed the flushing medium through the shoulder and a seat projecting from the shoulder and surrounding the flushing hole. In this embodiment, the sealing section is created at the point where the flexible membrane is pushed against the seat and the flushing hole. In the shoulder, flushing nozzle may be preferentially created.

The method of opening of the membrane gas separator with the built-in valve in this invention is based on the following steps: initiating the inlet medium flow through the inlet manifold, opening of the check valve and initiating inlet medium flow through the check valve, inlet chamber and fibres to the interspace of the outlet chamber, opening of the sealing section and initiating the flushing medium flow from the interspace of the outlet chamber through the central space to the flushing space, opening and deactivation of the throttling section and initiation of the final product flow from the inner space of fibres and the outlet chamber to the outlet manifold.

The method of closing of the membrane gas separator with the built-in valve in this invention is based on the following steps: stopping the inlet media from the inlet manifold, releasing pressure from the inlet manifold and maintaining pressure in the outlet manifold, closing the check valve and stopping the backflow of the inlet medium and final product from the inlet chamber, fibres and outlet chamber to the inlet manifold, closing and activation of the throttling section and initiating reduced backflow of the final product from the outlet manifold through the outlet chamber and the throttling section to the inner space of hollow fibres, closing the sealing section and stopping the flushing medium flow from the interspace of the outlet chamber through the central space to the flushing space.

The sealing section in the membrane gas separator with the built-in valve in this invention is open due to increased differential pressure of the final product between the interspace and the outlet chamber which results in the flexible membrane deformation and potential push-down of the inner flexible element by pushing the flexible membrane away from the shoulder and this creates a pneumatic connection in the shoulder.

The throttling section in the membrane gas separator in this invention is open and deactivated due to a further increase in the differential pressure of the final product between the interspace and the outlet chamber which results in the push-down of the outer flexible element and the valve plate movement by being pushed away from the outlet wall. The throttling section in the membrane gas separator in this invention is closed and activated due to a decrease in the differential pressure of the final product between the interspace and the outlet chamber which results in the outer flexible element stretching back and the valve plate moving by being pushed against the outlet wall.

The sealing section in the membrane gas separator with the built-in valve in this invention is closed due to a further decrease in differential pressure of the final product between the interspace and the outlet chamber which results in the flexible membrane stretching back and potentially inner flexible element stretching back in the way that the flexible membrane is pushed against the shoulder and this closes pneumatic connection in the shoulder.

The advantage of this invention is in maximizing the service life of the membrane separator fibres with a typical known embodiment of the inlet chamber, hollow selective fibres, outlet chamber, central core element and flushing space by a simple application of the built-in valve in the membrane separator without the need for any major modifications. The embodiment with a flexible membrane provides high robustness of the solution against deviations in production and spatial orientation of the membrane dryer. Another advantage is that none of the valves used—check valve and built-in valve—do not need any external control; they are controlled by a pressure change in the inlet manifold.

EXAMPLES OF INVENTION EMBODIMENTS

Detailed Description

Example 1

Figure 1:
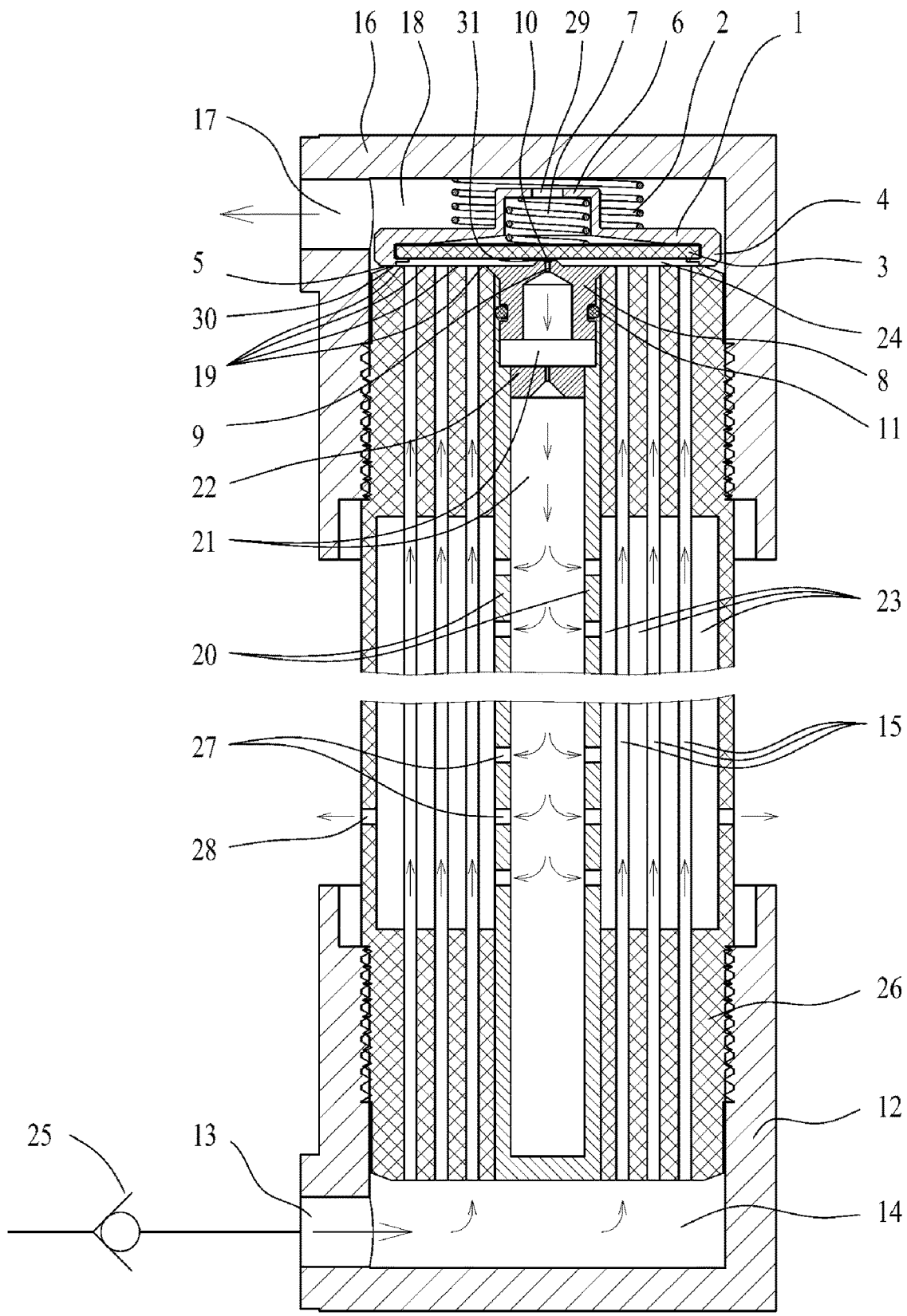
FIG. 1 shows the overall view of the membrane gas separator with the built-in valve.

FIG. 1 shows the overall view of the membrane gas separator with the built-in valve in the membrane compressed air dryer. The membrane compressed air dryer contains hollow fibres 15 allowing selective permeability through their walls of water molecules as a component separated from the inlet medium, i.e. wet compressed air. In this case, the final product from outlet inner spaces of hollow fibres 15 is dry air. A part of this dry air is also used as the flushing medium for the counter-flow of outer surfaces of hollow fibres 15. Hollow fibres 15 are laid parallel to each other inside the longitudinal tube 26 around the central core element 20. At the inlet end of the tube 26, there is an inlet casing 12 the inner space of which creates an inlet chamber 14 pneumatically connected with inner spaces of hollow fibres 15 at their inlet ends. On the inlet casing 12, there is an inlet hole 13 connected to the inlet manifold by means of the check valve 25. The inlet manifold is connected to the compressor to feed the wet compressed air. At the opposite—outlet—end of the tube 26, there is an outlet casing 16 the inner space of which creates an outlet chamber 18 pneumatically interconnected with inner spaces of hollow fibres 15 at their outlet ends. On the outlet casing 16, there is an outlet hole 17 connected to the outlet manifold to let dry air out. The ending of the tube 26 where the outlet ends of hollow fibres 15 lead creates the outlet wall 19 in the outlet chamber 18.

The central core element 20 contains a hollow space 21 leading to the centre of the outlet wall 19 and surrounded by all hollow fibre 15 mouths. The central space 21 is pneumatically connected to the outlet chamber 18 by means of the flushing nozzle 22 to remove the flushing medium from the outlet chamber 18. In the tube 26, a hollow flushing space 23 is created and this space surrounds outer surfaces of hollow fibres 15 to remove the separated component from the outer surface of fibres 15 by means of the flushing medium. The flushing space 23 is pneumatically connected with the central space 21 through permeating holes 27 in the central core element 20 to feed the flushing medium. On the outer shell of the tube 26, there are exhaust holes 28 to feed the separated component and the flushing medium from the flushing space 23 to the outer space outside the tube 26.

Figure 2:
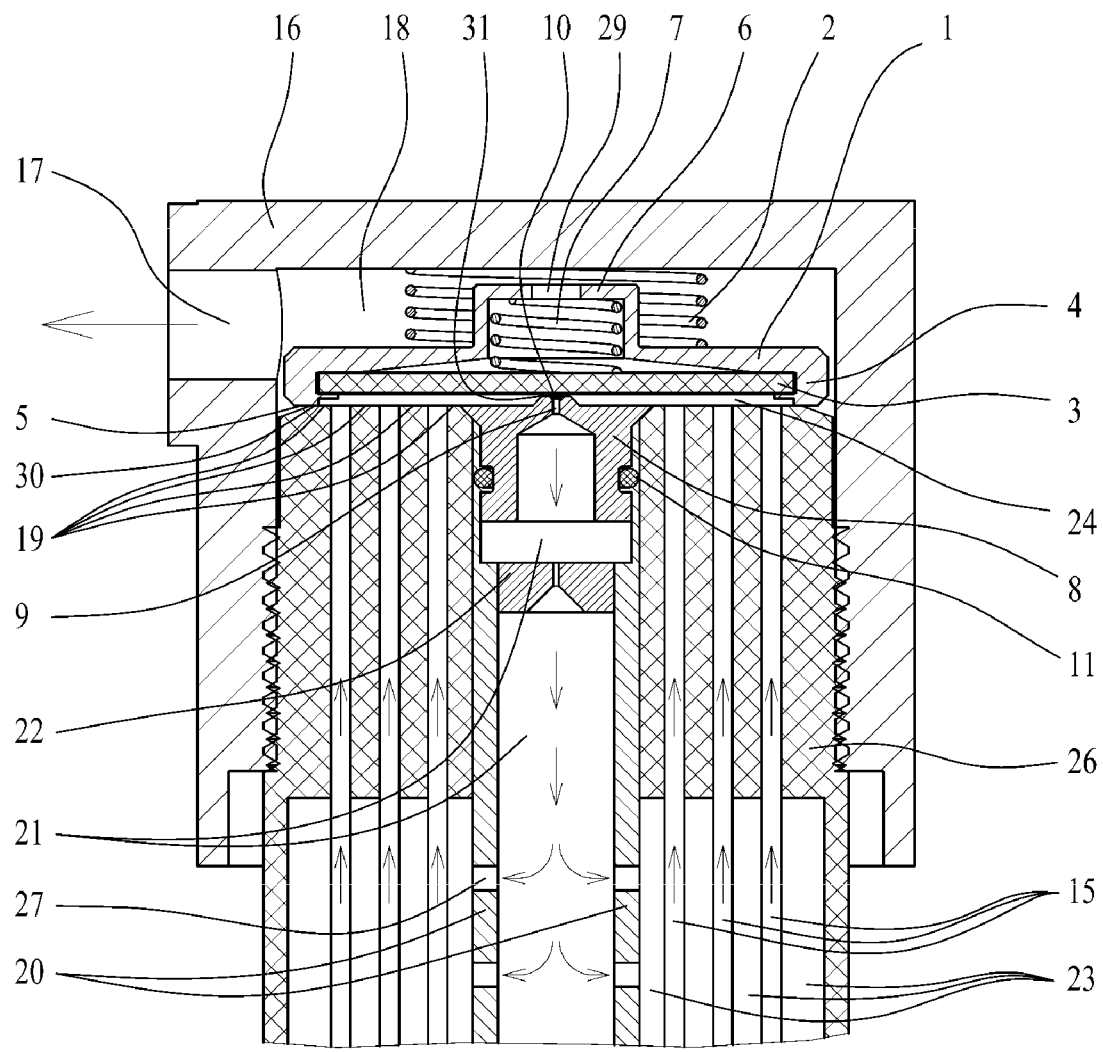
FIG. 2 shows the built-in valve in the membrane gas separator.

FIG. 2 shows the built-in valve in the membrane wet compressed air dryer. The built-in valve is located in the outlet chamber 18 and in the central space 21 and this valve is combined and contains a throttling section 30 and a sealing section 31. The built-in valve consists of the valve plate 1, outer flexible element 2, flexible membrane 3, inner flexible element 7 and the shoulder 8. The valve plate 1 has a brass body and it has round peripheral edge 4 concentric to the inside circumference of the outlet casing 16 and it is movably positioned in the outlet chamber 18. The outer flexible element 2 consisting of the coiled spring is located in the outlet chamber 18 between the wall opposite the outlet wall 19 and the valve plate 1 and it is attached to the outlet ending 6 of the valve plate 1. The peripheral edge 4 projects from the valve plate 1 towards the outlet wall 19 and its projection ends with the contact area 5 coplanar with the outlet wall 19. The valve plate 1 and its contact area 5 is pushed against the outlet wall 19 by means of the outer flexible element 2 and together with its peripheral edge 4 it surrounds all outlet mouths of hollow fibres 15 on the outlet wall 19.

At the point where the contact area 5 of the valve plate 1 is pushed against the outlet wall 19, the throttling section 30 is created by a small leakage due to the roughness of the contact are between channels and grooves. The throttling section 30 is located at the pneumatic connection of the outlet chamber 18 with the inner space of hollow fibres 15 in order to ensure reduced backflow of the final product from the outlet manifold through the outlet chamber 18 to the inner space of hollow fibres 15 when no inlet medium flows through the separator. In the inner space of the valve plate 1, the flexible membrane 3 is located in the peripheral edge 4. The inner space of the valve plate 1 created between the ending 6 of the valve plate and the flexible membrane 3 is pneumatically connected with the space of the outlet chamber 18 through the balancing hole 29 in the valve plate 1 ending 6 for pressure equalization between interconnected spaces. The throttling section 30 in the outlet chamber 18 separates the interspace 24 created by the inner space of the valve plate 1 between the flexible membrane 3, peripheral edge 4, and the outlet wall 19. The interspace 24 is pneumatically connected with the inner space of hollow fibres 15 leading to this space through the outlet wall 19. The brass shoulder 8 is inserted in the hollow central space 21 of the central core element 20 at the point where it enters the interspace 24 of the outlet chamber 18 at the center of the outlet wall 19. At the center of the shoulder 8, there is a throughput flushing hole 9 pneumatically interconnecting the interspace 24 of the outlet chamber 18 and the central space 21. The outside circumference of the shoulder 8 copies the inside circumference of the central core element 20 wherein the contact point between the shoulder 8 and the central core element 20 is sealed with a gasket 11. The flushing hole 9 leads to the interspace 24 of the outlet chamber 18 through the projecting seat 10 of the shoulder 8. At the point where the flexible membrane 3 is closely pushed against the seat 10 and the flushing hole 9 the sealing section 31 is created in order to stop the flow of flushing medium from the interspace 24 of the outlet chamber 18 through the central space 21 to the flushing space 23 when no inlet medium flows through the separator. The internal flexible element 7 consisting of the coiled spring is located inside the valve plate 1 between its ending 6 and the flexible membrane 3. The internal flexible element 7 pushes the flexible membrane 3 against the seat 10 and the flushing hole 9 of the shoulder 8. Inner flexible element 7 together with the flexible membrane 3 are less flexible than the outer flexible element 2 in order to ensure that the sealing section 31 opens earlier than the throttling section 30 when the inlet medium starts flowing through the separator. The throttling section 30 is located at the pneumatic connection between the interspace 24 and the outlet chamber 18 to ensure opening of the sealing section 31 by the inlet medium flow creating a suitable flow resistance. The check valve 25 is located at the pneumatic connection between the inlet manifold and the inlet chamber 14 to stop the backflow of the inlet medium and the final product from the inlet chamber 14, fibres 15 and outlet chamber 18 back to the inlet manifold when no inlet medium flows through the separator.

Figure 3A:
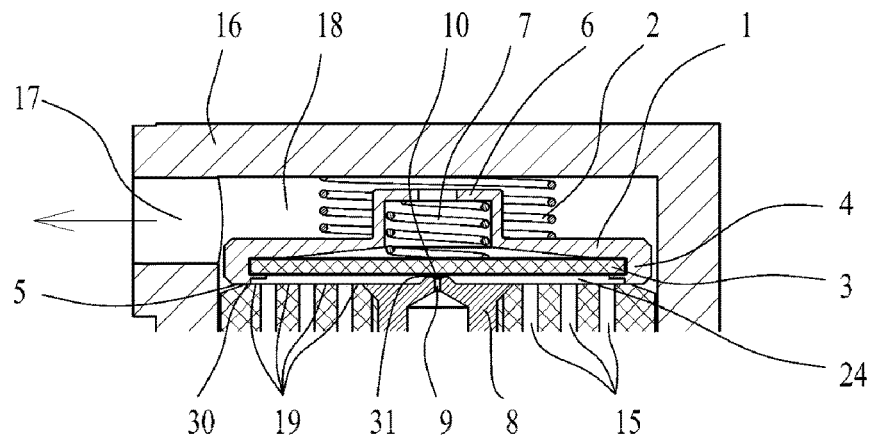
FIG. 3*a* shows the built-in valve when the throttling section is closed and activated while the sealing section is closed.
Figure 3B:
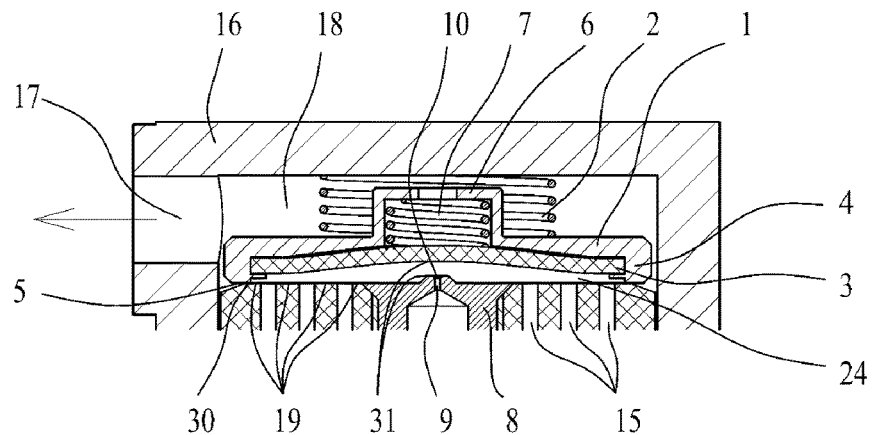
FIG. 3*b* shows the built-in valve when the throttling section is closed and activated while the sealing section is open.
Figure 3C:
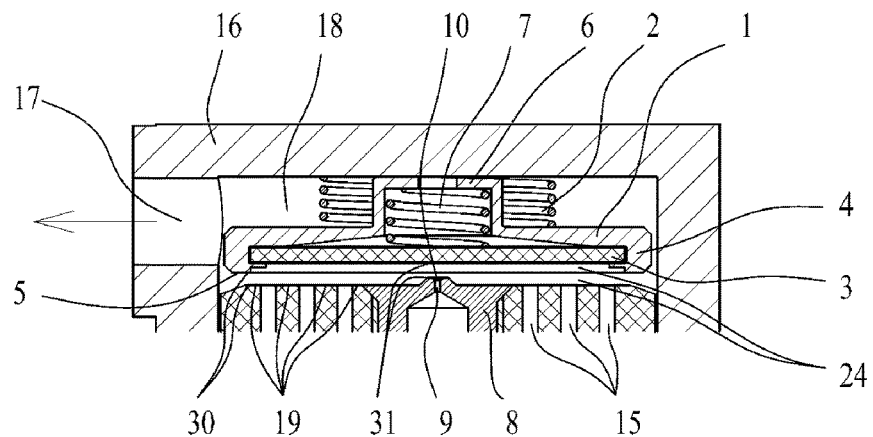
FIG. 3*c* shows the built-in valve when the throttling section is open and deactivated while the sealing section is open

FIG. 3a shows the built-in valve when the throttling section is closed and activated while the sealing section is closed. When the compressor is started the inlet medium starts flowing through the inlet manifold. Subsequently, the check valve 25 is open and the inlet media starts flowing through the check valve 25, inlet hole 13, inlet chamber 14 and fibres 15 to the interspace 24 of the outlet chamber 18 where it becomes the final product. Since, at this stage of opening, the closed and activated throttling section 30 creates the appropriate flow resistance of the final product flowing between the interspace 24 and the outlet chamber 18, the differential pressure of the final product between the interspace 24 and the outlet chamber 18 increases. The differential pressure deforms the flexible membrane 3 and presses down the inner flexible element 7. Thus the flexible membrane 3 is pushed away from the seat 10 and the flushing hole 9 of the shoulder 8, and the sealing section 31 is open. This stage of opening is shown in FIG. 3b. Since the flexibility force of the inner flexible element 7 together with the flexible membrane 3 is lower than the flexibility power of the outer flexible element 2, only the sealing section 31 is open at this stage of opening, and the throttling section 30 still remains closed and activated. When the sealing section 31 is open, the flushing medium starts flowing from the interspace 24 of the outlet chamber 18 through the flushing hole 9, flushing nozzle 22, central space 21 and permeating holes 27 to the flushing space 23. The separated component permeates through the fibre 15 walls to the flushing space 23. In the flushing space 23, outside surfaces of hollow fibres 15 are counter-flow flushed by the flushing medium. The separated component is removed from outside surfaces of hollow fibres 15 and from the flushing space 23 by means of the flushing medium through the exhaust holes 28 to the outer space outside the tube 26. Further increase in the differential pressure of the final product between the interspace 24 and the outlet chamber 18 pushes the outer flexible element 2 down and moves the valve plate 1 pushing the contact area 5 of the valve plate 1 away from the outlet wall 19 and opening and deactivating the throttling section 30. This stage of opening is shown in FIG. 3c. Opening and deactivating the throttling section 30 starts the flow of the final product from the inner space of fibres 15, through the interspace 24, outlet chamber 18 and the outlet hole 17 to the outlet manifold.

When the compressor stops, the inlet media flow from the inlet manifold stops and the pressure of the inlet manifold is released. Since no pressure is released from the outlet manifold after the compressor stops, the check valve 25 closes and the backflow of the inlet media and the final product from the inlet chamber 14, fibres 15 and outlet chamber 18 to the inlet manifold stops. Decrease in the differential pressure of the final product between the interspace 24 and the outlet chamber 18 stretches the outer flexible element 2 back and moves the valve plate 1 pushing the contact area 5 of the valve plate 1 away from the outlet wall 19 and opening and deactivating the throttling section 30. Subsequently, the reduced backflow of the final product starts from the outlet manifold through the outlet hole 17, outlet chamber 18, throttling section 30 and the interspace 24 to the inner space of hollow fibres 15. Further decrease in the differential pressure of the final product between the interspace 24 and the outlet chamber 18 results in stretching of the inner flexible element 7 and straightening of the flexible membrane 3 by pushing it against the seat 10 and the flushing hole 9 of the shoulder 8, and the sealing section 31 closes. When the sealing section 31 is closed, the flushing medium stops flowing from the interspace 24 of the outlet chamber 18 through the flushing hole 9, flushing nozzle 22, central space 21 and permeating holes 27 to the flushing space 23.

Example 2

This example (not shown in figures) contains all elements of the example 1 except for inner flexible element 7. The flexible membrane 3 is pushed against the seat 10 and the flushing hole 9 of the shoulder 8 by its own flexibility force without any pressing force of the inner flexible element 7.

INDUSTRIAL APPLICABILITY

The membrane gas separator with a built-in valve and the method of its opening and closing can be used especially for compressed air drying, nitrogen and oxygen production and separation or treatment of other gases in cyclic (intermittent) operation.

REFERENCE SIGNS LIST

1—valve plate
2—outer flexible element
3—flexible membrane
4—peripheral edge
5—contact area
6—ending
7—inner flexible element
8—shoulder
9—flushing hole
10—seat
11—gasket
12—inlet casing
13—inlet hole
14—inlet chamber
15—fibres
16—outlet casing
17—outlet hole
18—outlet chamber
19—outlet wall
20—central core element
21—central space
22—flushing nozzle
23—flushing space
24—interspace
25—check valve
26—tube 27—permeating hole
28—exhaust hole
29—balancing hole
30—throttling section
31—sealing section It is claimed:

1. A membrane gas separator with a built-in valve wherein the membrane separator contains:
   an inlet chamber used to feed an inlet medium from the inlet manifold;
   hollow selective fibres to feed an inlet medium and for permeation of a separated component through walls of the hollow fibres to a flushing space with fibres interconnecting the inlet chamber and an outlet chamber;
   the outlet chamber where pneumatic outlets of hollow fibres lead through an outlet wall and which are used to feed a final product to an outlet manifold;
   a central core element with a central space pneumatically interconnecting the outlet chamber with the flushing space through the flushing nozzle to feed a flushing medium to the flushing space;
   the flushing space surrounding hollow fibres to remove the separated component from the outer surface of fibres using the flushing medium, characterized in that the membrane gas separator contains:
   the built-in combined valve located in the outlet chamber and in the central space wherein the built-in combined valve contains the throttling section and the sealing section where:
      the throttling section is located at a pneumatic connection of the outlet chamber with the inner space of hollow fibres to ensure reduced backflow of the final product from the outlet manifold through the outlet chamber to the inner space of hollow fibres when no inlet medium flows through the separator,
      the throttling section in the outlet chamber separates the interspace pneumatically connected with the inner space of hollow fibres,
      the sealing section is located at the pneumatic connection of the interspace in the outlet chamber and the central space to stop the flushing media flow from the outlet chamber through the central space to the flushing space when no inlet medium flows through the separator,
      the throttling section is located at the pneumatic connection between the interspace and outlet chamber to ensure opening of the sealing section by the final product flow creating a suitable flow resistance;
      the membrane gas separator further contains a check valve located at the pneumatic connection between the inlet manifold and the inlet chamber to stop the backflow of the inlet medium and the final product from the inlet chamber, fibres and the outlet chamber back to the inlet manifold when no inlet medium flows through the separator.

2. The membrane gas separator with the built-in valve according to claim 1 characterized in that the built-in combined valve contains:
   a valve plate movably located in the outlet chamber;
   an outer flexible element is located in the outlet chamber between the wall opposite to the outlet wall and the valve plate;
   the flexible membrane placed in the valve plate; and
   the shoulder located in the central space which pneumatically interconnects the interspace of the outlet chamber and the central space; where the throttling section is created at the point where the valve plate is pressed against the outlet wall by means of the outer flexible element, wherein a small leakage is deliberately created at the push-down point; the sealing section is created at the point of the close push-down contact between the flexible membrane with the shoulder; where the interspace is created by the inner space of the valve plate between the flexible membrane and the outlet wall; where the flexible force of the flexible membrane is lower than that of the outer flexible element in order to ensure that the sealing section opens earlier than the throttling section when the inlet medium starts flowing through the separator.

3. The membrane gas separator with the built-in valve according to claim 1, characterized in that the valve plate contains:
   a peripheral edge, and
   the contact area located at the peripheral edge; where the flexible membrane is placed in the peripheral edge; and the throttling section is created at the point where the contact area is pushed against the outlet wall; and where the interspace is created by the contact area and the peripheral edge surrounding all hollow fibre outlet mouths in the outlet wall.

4. The membrane gas separator with the built-in valve according to claim 1, characterized in that the valve plate contains:
   an ending, and
   the internal flexible element located inside the valve plate between the ending and the flexible membrane; where the inner flexible element pushes the flexible membrane against the shoulder; and where the inner flexible element together with the flexible membrane are less flexible than the outer flexible element in order to ensure that the sealing section opens earlier than the throttling section when the inlet medium starts flowing through the separator.

5. The membrane gas separator with the built-in valve according to claim 1, characterized in that the shoulder contains:
   the flushing hole to feed the flushing medium through the shoulder and
   the seat projecting from the shoulder and surrounding the flushing hole; where the sealing section is created at the point where the flexible membrane is pushed against the seat and the flushing hole.

6. The membrane gas separator with the built-in valve according to claim 1, characterized in that the flushing nozzle is created in the shoulder.

7. The method of opening of the membrane gas separator with the built-in valve according to claim 1, characterized in that the method contains of these steps: the inlet medium starts flowing through the inlet manifold; the check valve opens and an inlet media starts flowing through the check valve, the inlet chamber and the hollow fibres to the interspace of the outlet chamber; the sealing section opens and the flushing medium starts flowing from the interspace of the outlet chamber through the central space to the flushing space; the throttling section is open and deactivated and the final product starts flowing from the inner space of the hollow fibres through the interspace of the hollow fibres and the outlet chamber and to the outlet manifold.

8. The method of closing of the membrane gas separator with the built-in valve according to claim 1, characterized in that the method contains of these steps: the flow of the inlet medium from the inlet manifold stops, the pressure is released from the inlet manifold and it is maintained in the outlet manifold; the check valve is closed and the backflow of the inlet medium and the final product from the inlet chamber, the hollow fibres and the outlet chamber to the inlet manifold is stopped; the throttling section is closed and activated, and the reduced backflow of the final product starts from the outlet manifold through the outlet chamber and the throttling section to the inner space of hollow fibres; the sealing section opens and the flushing medium stops flowing from the interspace of the outlet chamber through the central space to the flushing space.

9. The method of opening of the membrane gas separator with the built-in valve according to claim 1, characterized in that the sealing section opens as a result of an increase in the differential pressure of the final product between the interspace and the outlet chamber which deforms a flexible membrane pushing it away from a shoulder and this opens the pneumatic connection in the shoulder; and the throttling section is open and deactivated due to a further increase in the differential pressure of the final product between the interspace and the outlet chamber which results in the push-down of an outer flexible element and a valve plate movement by being pushed away from the outlet wall.

10. The method of closing of the membrane gas separator with the built-in valve according to claim 1, characterized in that the throttling section is closed and activated due to a decrease in the differential pressure of the final product between the interspace and the outlet chamber which results in the outer flexible element stretching back and a valve plate moving by being pushed against the outlet wall; the sealing section closes as a result of further decrease in the differential pressure of the final product between the interspace and the outlet chamber which straightens a flexible membrane pushing it against a shoulder and this closes the pneumatic connection in the shoulder.

* * * * *